(12) United States Patent
Ishida et al.

(10) Patent No.: US 10,879,542 B2
(45) Date of Patent: Dec. 29, 2020

(54) FUEL CELL

(71) Applicant: HONDA MOTOR CO., LTD., Tokyo (JP)

(72) Inventors: Kentaro Ishida, Wako (JP); Hiroshi Morikawa, Wako (JP); Yosuke Nishida, Wako (JP); Satoshi Oyama, Wako (JP); Masahiro Matsutani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 113 days.

(21) Appl. No.: 16/207,309

(22) Filed: Dec. 3, 2018

(65) Prior Publication Data

US 2019/0173104 A1    Jun. 6, 2019

(30) Foreign Application Priority Data

Dec. 5, 2017   (JP) ................. 2017-233185

(51) Int. Cl.
| | | |
|---|---|---|
| *H01M 8/00* | (2016.01) | |
| *H01M 8/0273* | (2016.01) | |
| *H01M 8/1004* | (2016.01) | |
| *H01M 8/0267* | (2016.01) | |
| *H01M 8/0258* | (2016.01) | |
| *H01M 8/0284* | (2016.01) | |

(52) U.S. Cl.
CPC ....... *H01M 8/0273* (2013.01); *H01M 8/0258* (2013.01); *H01M 8/0267* (2013.01); *H01M 8/0284* (2013.01); *H01M 8/1004* (2013.01)

(58) Field of Classification Search
CPC ............. H01M 8/0258; H01M 8/0267; H01M 8/0273; H01M 8/0284; H01M 8/1004
See application file for complete search history.

(56) References Cited

U.S. PATENT DOCUMENTS

| | | | | |
|---|---|---|---|---|
| 4,857,420 A | * | 8/1989 | Maricle ............... | H01M 8/2435 429/495 |
| 8,399,150 B2 | | 3/2013 | Miller et al. | |
| 2007/0087256 A1 | * | 4/2007 | Hirashige ............. | H01M 4/926 429/419 |

(Continued)

FOREIGN PATENT DOCUMENTS

| | | |
|---|---|---|
| JP | 2008-171615 | 7/2008 |
| JP | 2017-033639 | 2/2017 |

OTHER PUBLICATIONS

Japanese Office Action for Japanese Patent Application No. 2017-233185 dated Jul. 30, 2019.

*Primary Examiner* — Cynthia H Kelly
*Assistant Examiner* — Monique M Wills
(74) *Attorney, Agent, or Firm* — Amin, Turocy & Watson, LLP

(57) ABSTRACT

A fuel cell includes an MEA, a first separator, and a second separator. A frame member is provided around an outer peripheral portion of an MEA, and held between the first separator and the second separator. The height of an oxygen-containing gas flow field formed by the second separator, from the MEA is larger than the height of a fuel gas flow field formed by the first separator, from the MEA. The central position of the MEA in the thickness direction and the central position of the frame member outer peripheral portion of the frame member in the thickness direction are offset from each other.

6 Claims, 4 Drawing Sheets

(56) References Cited

U.S. PATENT DOCUMENTS

2008/0166622 A1 7/2008 Shizuku et al.
2013/0293976 A1* 11/2013 Takada .................. G02B 5/208
                                                            359/889
2017/0263952 A1* 9/2017 Terada ................ H01M 8/1018

* cited by examiner

FUEL CELL

CROSS-REFERENCE TO RELATED APPLICATION

This application is based upon and claims the benefit of priority from Japanese Patent Application No. 2017-233185 filed on Dec. 5, 2017, the contents of which are incorporated herein by reference.

BACKGROUND OF THE INVENTION

Field of the Invention

The present invention relates to a fuel cell including a frame member provided in an outer peripheral portion of a membrane electrode assembly.

Description of the Related Art

A fuel cell (unit power generation cell: hereinafter also referred to as the power generation cell) includes a membrane electrode assembly (MEA) and a pair of separators sandwiching the membrane electrode assembly. The membrane electrode assembly is formed by stacking an anode, a solid polymer electrolyte membrane, and a cathode together. In the stacked state, a fuel gas flow field is provided between the anode and the separator, and a fuel gas is supplied into the fuel gas flow field. Further, an oxygen-containing gas flow field is provided between the cathode and the separator, and an oxygen-containing gas is supplied to the oxygen-containing gas flow field. For example, a predetermined number of power generation cells are stacked together to form an in-vehicle fuel cell stack.

Further, in recent years, as disclosed in U.S. Pat. No. 8,399,150, in some cases, the membrane electrode assembly is in the form of a frame equipped MEA including a frame member (sub-gasket) in an outer peripheral portion of the MEA. The frame member reduces the quantity of expensive material used for the solid polymer electrolyte membrane, and protects the solid polymer electrolyte membrane in the form of a thin membrane having low strength.

SUMMARY OF THE INVENTION

In the frame equipped MEA, the inner peripheral portion of the frame member is joined to the MEA and the outer peripheral portion of the frame member is sandwiched between ridge shaped seals provided on a pair of the separators. The frame equipped MEA needs to have structure where the pair of the separators are uniformly sealed against the outer peripheral portion of the frame member, and the MEA and the pair of the separators contact each other at a suitable contact pressure.

In particular, in the case of using air as the oxygen-containing gas, since a large quantity of gases (nitrogen, carbon dioxide, etc.) are contained in the air, in the fuel cell, the quantity of the oxygen-containing gas supplied to the oxygen-containing gas flow field is larger than the quantity of the fuel gas supplied to the fuel gas flow field. However, in order to realize this structure, if the height of one of the reactant gas flow fields of one of the pair of separators is changed, the pressures applied from the separators to the MEA and the frame member, respectively become non-uniform, and the power generation performance and the durability of the fuel cell are degraded disadvantageously.

The present invention has been made to solve the above problem, and an object of the present invention is to provide a fuel cell having simple structure which makes it possible to exert the desired sealing function and makes it possible to supply the optimum quantities of an oxygen-containing gas and a fuel gas.

In order to achieve the above object, the present invention provides a fuel cell including: a membrane electrode assembly, the membrane electrode assembly including an electrolyte membrane, and a first electrode and a second electrode provided on both surfaces of the electrolyte membrane, respectively; a first separator stacked on the first electrode of the membrane electrode assembly; and a second separator stacked on the second electrode of the membrane electrode assembly, wherein a first flow field is formed between the first separator and the first electrode, a first reactant gas is supplied to the first flow field, a second flow field is formed between the second separator and the second electrode, and a second reactant gas is supplied to the second flow field, wherein a frame member is provided around an outer peripheral portion of the membrane electrode assembly, the frame member being configured to be held between the first separator and the second separator; the frame member includes a frame member inner peripheral portion joined to the membrane electrode assembly and a frame member outer peripheral portion which is continuous with the frame member inner peripheral portion and thicker than the frame member inner peripheral portion; a height of the second flow field formed by the second separator, from the membrane electrode assembly is larger than a height of the first flow field formed by the first separator, from the membrane electrode assembly; and a central position of the membrane electrode assembly in a thickness direction and a central position of the frame member outer peripheral portion in a thickness direction are offset from each other.

Further, preferably, a height of the first seal configured to seal the frame member outer peripheral portion of the first separator and a height of the second seal configured to seal the frame member outer peripheral portion of the second separator may be same.

In this case, the first seal and the second seal may form bead seal structure.

Alternatively, the first seal and the second seal may be made of elastic rubber material.

The frame member may include a first frame shaped sheet including the frame member inner peripheral portion and a second frame shaped sheet joined to the first frame shaped sheet in a manner that the first frame shaped sheet and the second frame shaped sheet jointly form the frame member outer peripheral portion, and a thickness of the second frame shaped sheet may be larger than a thickness of the first frame shaped sheet.

Further, the frame member may include a first frame shaped sheet including the frame member inner peripheral portion and a second frame shaped sheet joined to the first frame shaped sheet in a manner that the first frame shaped sheet and the second frame shaped sheet jointly form the frame member outer peripheral portion, and a thickness of the first frame shaped sheet and a thickness of the second frame shaped sheet may be same.

Further, the first frame shaped sheet may be held between, and joined to the electrolyte membrane and the first electrode or the second electrode.

Furthermore, preferably, the first electrode may be an anode and the second electrode is a cathode, the first flow field may be configured to supply a hydrogen-containing gas as the first reactant gas to the anode, and the second flow field may be configured to supply an oxygen-containing gas as the second reactant gas to the cathode.

Moreover, each of the anode and the cathode may include structure where a catalyst layer and a gas diffusion layer are stacked together, and a thickness of the catalyst layer of the cathode is larger than a thickness of the catalyst layer of the anode.

In the present invention, the height of the second flow field formed by the second separator is larger than the height of the first flow field formed by the first separator. Therefore, it is possible to increase the flow rate of the second reactant gas supplied to the second flow field. That is, even if the gas components (nitrogen, carbon dioxide, etc.) other than the gas which contributes to reactions are mixed with the second reactant gas, it is possible to sufficiently supply the gas which contributes to the reactions, and perform power generation in the membrane electrode assembly suitably. Further, the central position of the membrane electrode assembly in the thickness direction and the central position of the frame member outer peripheral portion in the thickness direction are offset from each other. Therefore, even in the structure where the height of the first flow field formed by the first separator is larger than the height of the second flow field formed by the second separator, in the frame member outer peripheral portion, it is possible to suitably achieve the desired sealing performance between each of the separators and the frame member. Accordingly, it is possible to greatly improve the power generation performance and the durability.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Hereinafter, preferred embodiments of the present invention will be described in detail with reference to the accompanying drawings.

First Embodiment

Figure 1:
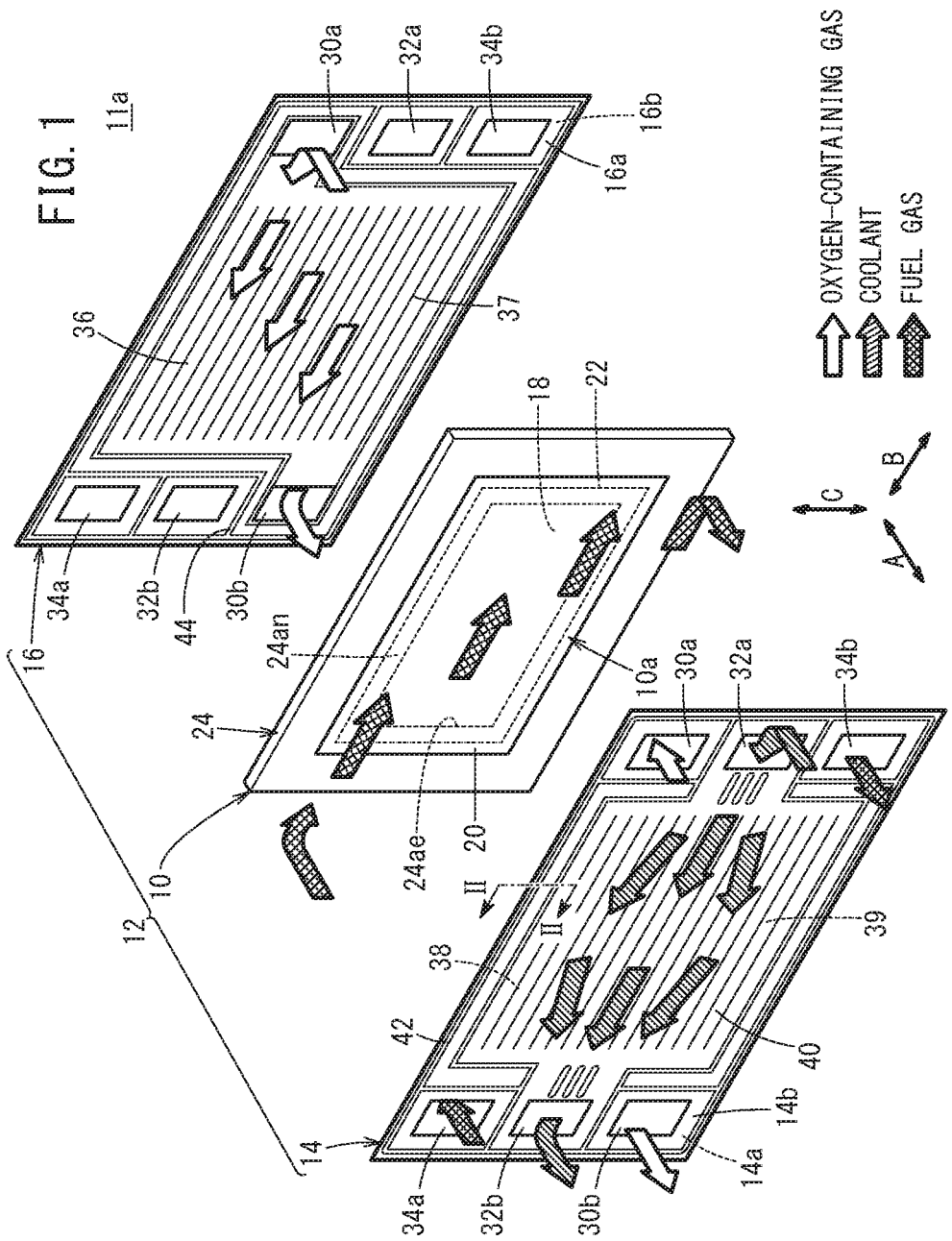
FIG. 1 is an exploded perspective view showing main components of a power generation cell according to a first embodiment of the present invention.

As shown in FIG. 1, a power generation cell (fuel cell) 12 according to a first embodiment includes a frame equipped membrane electrode assembly 10 (hereinafter referred to as the frame equipped MEA 10), and a first separator 14 and a second separator 16 provided on both surfaces of the frame equipped MEA 10, respectively. For example, the power generation cell 12 is a rectangular solid polymer electrolyte fuel cell elongated in a lateral (or longitudinal) direction. The power generation cells 12 are stacked together in the horizontal direction indicated by the arrow A to form a fuel cell stack 11a. The power generation cells 12 may be stacked together in the direction of gravity. For example, the fuel cell stack 11a is mounted as an in-vehicle fuel cell stack, in a fuel cell electric automobile (not shown).

The frame equipped MEA 10 includes a membrane electrode assembly 10a (hereinafter referred to as the "MEA 10a"). The MEA 10a includes an electrolyte membrane 18, and an anode (first electrode) 20 and a cathode 22 (second electrode) provided on both sides of the electrolyte membrane 18, respectively.

Further, the power generation cell 12 is formed by sandwiching the frame equipped MEA 10 between the first separator 14 and the second separator 16. Each of the first separator 14 and the second separator 16 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Alternatively, each of the first separator 14 and the second separator 16 is formed by molding or machining a carbon member.

At one end of the power generation cell 12 in a longitudinal direction indicated by an arrow B (horizontal direction), an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction indicated by the arrow A. An oxygen-containing gas (second reactant gas) such as air is supplied through the oxygen-containing gas supply passage 30a. Coolant such as pure water, ethylene glycol, oil is supplied to the coolant supply passage 32a. A fuel gas (first reactant gas) such as a hydrogen-containing gas is discharged through the fuel gas discharge passage 34b. The oxygen-containing gas supply passage 30a, the coolant supply passage 32a, and the fuel gas discharge passage 34b are arranged in the vertical direction indicated by the arrow C.

At the other end of the power generation cell 12 in the longitudinal direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction indicated by the arrow C.

The first separator 14 has a fuel gas flow field (first flow field) 38 on its surface 14a facing the frame equipped MEA 10. The fuel gas flow field 38 is connected to the fuel gas supply passage 34a and the fuel gas discharge passage 34b (see also FIG. 2). Specifically, the fuel gas flow field 38 is formed between the first separator 14 and the anode 20. The fuel gas flow field 38 includes a plurality of straight flow grooves (or wavy flow grooves) extending in the direction indicated by the arrow B.

The second separator 16 has an oxygen-containing gas flow field 36 (second flow field) on its surface 16a facing the frame equipped MEA 10. The oxygen-containing gas flow field 36 is connected to the oxygen-containing gas supply passage 30a and the oxygen-containing gas discharge passage 30b (see also FIG. 2). Specifically, the oxygen-containing gas flow field 36 is formed between the second separator 16 and the cathode 22. The oxygen-containing gas flow field 36 includes a plurality of straight flow grooves (or wavy flow grooves) extending in the direction indicated by the arrow B.

Further, the plurality of power generation cells 12 are stacked together, a coolant flow field 40 is formed between a surface 14b of the first separator 14 and a surface 16b of the second separator 16 that are adjacent to each other. The coolant flow field 40 is connected to the coolant supply passage 32a and the coolant discharge passage 32b. The coolant flow field 40 extends in the direction indicated by the arrow B.

Figure 2:
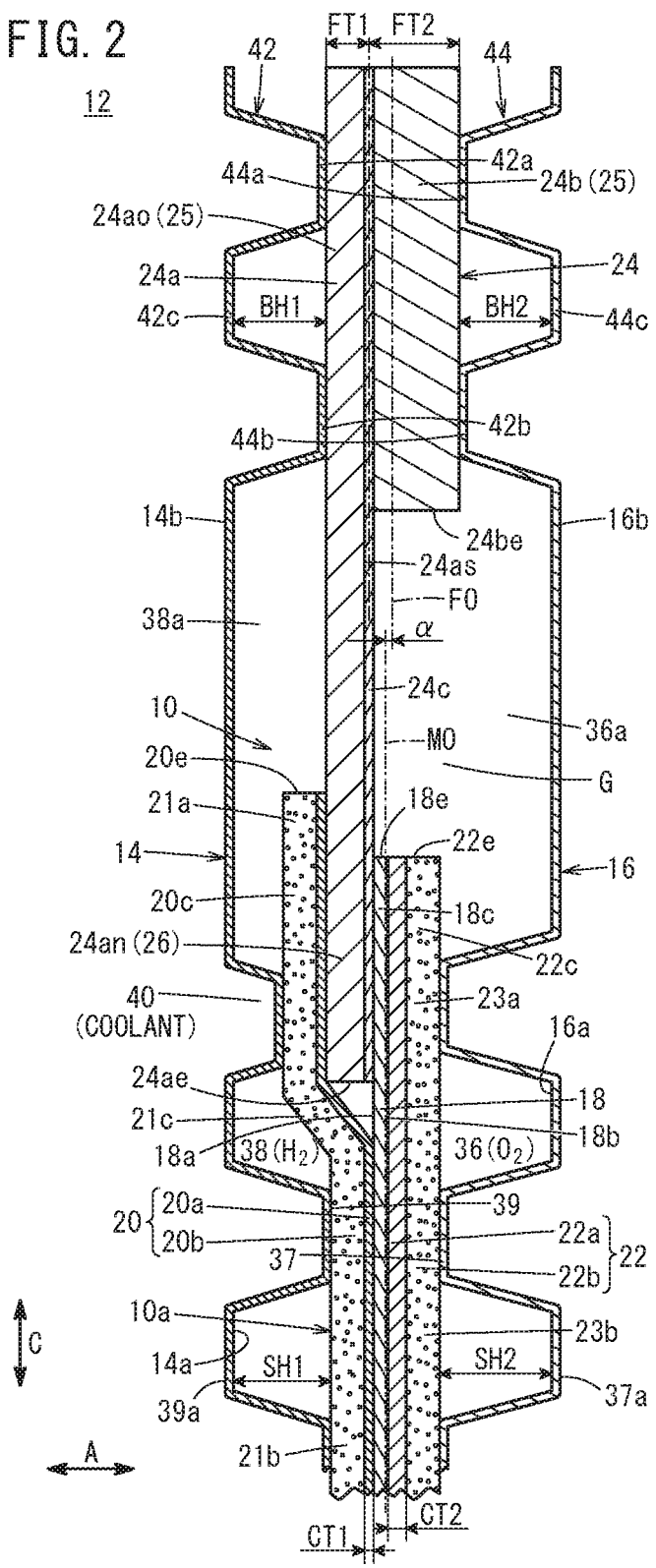
FIG. 2 is a cross sectional view taken along a line II-II in FIG. 1.

As shown in FIG. 2, a plurality of ridges 39 forming the fuel gas flow field 38 are provided on the surface 14a of the first separator 14 (facing the frame equipped MEA 10). The ridges 39 are expanded toward the anode 20, and contact the anode 20. A plurality of ridges 37 forming the oxygen-containing gas flow field 36 are provided on the surface 16a of the second separator 16 (facing the frame equipped MEA 10). The ridges 37 are expanded toward the cathode 22, and contact the cathode 22. That is, the ridges 37 and the ridges 39 face each other, and the MEA 10a is sandwiched between the ridges 37 and the ridges 39.

Further, in the embodiment of the present invention, a height SH2 of the ridges 37 of the second separator 16 is larger than a height SH1 of the ridges 39 of the first separator 14. In contrast, the widths of the flat portions of the ridges 37, 39 of the first and second separators 14, 16 (portions which contact the anode 20 and the cathode 22, and portion where the separators 14, 16 contact each other) are the same. Therefore, the channel cross sectional area of the oxygen-containing gas flow field 36 formed in the second separator 16 is larger than the channel cross sectional area of the fuel gas flow field 38 formed in the first separator 14.

For example, the electrolyte membrane 18 of the MEA 10a is a solid polymer electrolyte membrane (cation ion exchange membrane). For example, the solid polymer electrolyte membrane is a thin membrane of perfluorosulfonic acid containing water. A fluorine based electrolyte may be used as the electrolyte membrane 18. Alternatively, an HC (hydrocarbon) based electrolyte may be used as the electrolyte membrane 18.

The anode 20 includes a first electrode catalyst layer 20a joined to one surface 18a of the electrolyte membrane 18, and a first gas diffusion layer 20b stacked on the first electrode catalyst layer 20a. The first electrode catalyst layer 20a and the first gas diffusion layer 20b have the same surface size (outer size), and the surface size of the first electrode catalyst layer 20a and the first gas diffusion layer 20b is larger than the surface sizes of the electrolyte membrane 18 and the cathode 22.

The cathode 22 includes a second electrode catalyst layer 22a joined to another surface 18b of the electrolyte membrane 18, and a second gas diffusion layer 22b stacked on the second electrode catalyst layer 22a. The second electrode catalyst layer 22a and the second gas diffusion layer 22b have the same surface size (outer size) which is also the same as the surface size of the electrolyte membrane 18. Thus, in the surface direction of the electrolyte membrane 18 (in the direction indicated by the arrow C in FIG. 2), an outer end 22e of the cathode 22 and an outer end 18e of the electrolyte membrane 18 are at the same position.

The outer end 22e of the cathode 22 and the outer end 18e of the electrolyte membrane 18 are positioned inside an outer end 20e of the anode 20 over the entire periphery. It should be noted that the surface size of the cathode 22 may be larger than the surface size of the anode 20 and the outer end 22e of the cathode 22 may be positioned outside the outer end 20e of the anode 20 over the entire periphery (see also FIG. 4). Alternatively, the anode 20 and the cathode 22 may have the same surface size, and the outer end 20e of the anode 20 and the outer end 22e of the cathode 22 may be provided at the same position in the surface direction of the electrolyte membrane 18 (in the direction indicated by the arrow C in FIG. 2).

For example, the first electrode catalyst layer 20a is formed by porous carbon particles deposited uniformly on the surface of the first gas diffusion layer 20b together with an ion conductive polymer binder and platinum alloy supported on the porous carbon particles. For example, the second electrode catalyst layer 22a is formed by porous carbon particles deposited uniformly on the surface of the second gas diffusion layer 22b together with an ion conductive polymer binder and platinum alloy supported on the porous carbon particles. The surface size of the second electrode catalyst layer 22a is smaller than the surface size of the first electrode catalyst layer 20a.

The first gas diffusion layer 20b and the second gas diffusion layer 22b are made of carbon paper or carbon cloth, etc. The surface size of the second gas diffusion layer 22b is smaller than the surface size of the first gas diffusion layer 20b.

In the embodiment of the present invention, a thickness CT2 of the second electrode catalyst layer 22a is larger than a thickness CT1 of the first electrode catalyst layer 20a. In contrast, the first gas diffusion layer 20b and the second gas diffusion layer 22b have the same thickness. Therefore, the thickness of the cathode 22 is slightly larger than the thickness of the anode 20. That is, a central position MO of the MEA 10a in the thickness direction is shifted from the central position of the electrolyte membrane 18 in the thickness direction toward the cathode 22. It should be noted that the electrically conductive porous layer may be interposed between the first electrode catalyst layer 20a and the first gas diffusion layer 20b, and between the second electrode catalyst layer 22a and the second gas diffusion layer 22b.

As shown in FIGS. 1 and 2, the frame equipped MEA 10 further includes a frame member (sub-gasket) 24. The frame member 24 is provided around the outer end of the electrolyte membrane 18, and joined to the anode 20 and the cathode 22. The frame member 24 includes two frame shaped sheets having different thicknesses, in a frame member outer peripheral portion 25. Specifically, the frame member 24 includes a first frame shaped sheet 24a and a second frame shaped sheet 24b. The first frame shaped sheet 24a extends inward from the frame member outer peripheral portion 25 of the frame member 24 and is joined to the outer peripheral portion of the MEA 10a. The second frame shaped sheet 24b is joined to the outer peripheral portion 24ao of the first frame shaped sheet 24a. The first frame shaped sheet 24a and the second frame shaped sheet 24b are joined together in the thickness direction by an adhesive layer 24c made of adhesive. Therefore, the frame member outer peripheral portion 25 of the frame member 24 is thicker than a frame member inner peripheral portion 26 of the frame member 24.

The thickness of the first frame shaped sheet 24a is smaller than the thickness of the second frame shaped sheet 24b. An inner peripheral portion 24an of the first frame shaped sheet 24a extends inward from an outer peripheral portion 24ao joined to the second frame shaped sheet 24b, and form the frame member inner peripheral portion 26 provided inside the MEA 10a, and joined to the MEA 10a.

Specifically, the inner peripheral portion 24an of the first frame shaped sheet 24a is held between an outer peripheral portion 18c of the electrolyte membrane 18 and an outer peripheral portion 20c of the anode 20. The inner peripheral portion 24an of the first frame shaped sheet 24a and the outer peripheral portion 18c of the electrolyte membrane 18 are joined together though the adhesive layer 24c.

In the structure, a step is formed in the anode 20, at a position corresponding to an inner end 24ae of the first frame shaped sheet 24a. That is, the anode 20 includes an inclined area 21c between an area 21a overlapped with the inner peripheral portion 24an of the first frame shaped sheet 24a and an area 21b overlapped with the electrolyte membrane 18. The first electrode catalyst layer 20a and the first gas diffusion layer 20b in the inclined area 21c are inclined relative to the electrolyte membrane 18.

In the anode 20, a surface of the area 21a overlapped with the inner peripheral portion 24an of the first frame shaped sheet 24a, adjacent to the first separator 14 is spaced from the electrolyte membrane 18, in comparison with a surface of the area 21b overlapped with the electrolyte membrane 18, adjacent to the first separator 14.

In contrast, the cathode 22 has a flat shape from an area 23b overlapped with the electrolyte membrane 18 to an area 23a overlapped with the inner peripheral portion 24an of the first frame shaped sheet 24a. Therefore, the second electrode catalyst layer 22a and the second gas diffusion layer 22b are in parallel to the electrolyte membrane 18 from the area 23b overlapped with the electrolyte membrane 18 to the area 23a overlapped with the inner peripheral portion 24an of the first frame shaped sheet 24a. It should be noted that the cathode 22 may include an inclined area corresponding to the inclined area 21c of the anode 20.

A thickness FT1 of the outer peripheral portion 24ao of the first frame shaped sheet 24a (thickness from the center of the adhesive layer 24c to the outside of the first frame shaped sheet 24a) and a thickness FT2 of the second frame shaped sheet 24b (thickness from the center of the adhesive layer 24c to the outside of the second frame shaped sheet 24b) have the relationship of FT1<FT2. Therefore, the frame member outer peripheral portion 25 of the frame member 24 is sufficiently thicker than the frame member inner peripheral portion 26. A central position FO in the thickness direction of the frame member outer peripheral portion 25 is positioned inside the second frame shaped sheet 24b.

In this regard, the central position FO of the frame member outer peripheral portion 25 of the frame member 24 and the central position MO of the MEA 10a in the thickness direction are shifted (offset) from each other in a cross sectional side view. For example, the central position FO of the frame member 24 in the thickness direction is shifted from the central position MO of the MEA 10a in the thickness direction toward the second separator 16. Stated otherwise, the frame equipped MEA 10 is sandwiched between the separators 14, 16 in a manner that the position and the thickness of the frame member outer peripheral portion 25 of the frame member 24 and the position and thickness of the MEA 10a are shifted (different) from each other. A shift amount α between the central position FO of the frame member 24 in the thickness direction and the central position MO of the MEA 10a in the thickness direction is designed in consideration of, e.g., the thickness of the power generation cell 12 including the MEA 10a and the frame member outer peripheral portion 25 and the thickness of each of the separators 14, 16.

An inner end 24be of the second frame shaped sheet 24b is positioned outside the inner end 24ae of the first frame shaped sheet 24a (in a direction away from the MEA 10a), and positioned outside the outer end 20e of the anode 20 and the outer end 22e of the cathode 22. A gap G is formed between the inner end 24be of the second frame shaped sheet 24b and the outer end 22e of the cathode 22. The gap G forms a part of a channel 36a described later.

The first frame shaped sheet 24a and the second frame shaped sheet 24b are made of resin material. Examples of materials used for the first frame shaped sheet 24a and the second frame shaped sheet 24b include PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether) resin, PET (polyethylene terephthalate), PBT (polybutylene terephthalate), or modified polyolefin.

The adhesive layer 24c is provided over an entire surface 24as of the first frame shaped sheet 24a closer to the second frame shaped sheet 24b (closer to the cathode). At the gap G as described above, the first frame shaped sheet 24a is exposed to the gap G (channel 36a) through the adhesive layer 24c. As the adhesive of the adhesive layer 24c, for example, liquid adhesive or a hot melt sheet is provided. The adhesive is not limited to liquid or solid adhesive, and not limited to thermoplastic or thermosetting adhesive, etc.

A first seal line 42 (metal bead seal: first seal) is provided on the surface 14a of the first separator 14, along the outer peripheral portion of the first separator 14. The first seal line 42 is formed integrally with the first separator 14, and expanded toward the frame member 24. The first seal line 42 is deformed elastically, and contacts the outer peripheral portion 24ao of the first frame shaped sheet 24a (area overlapped with the second frame shaped sheet 24b) in an air-tight and liquid-tight manner. The first seal line 42 includes an outer bead 42a and an inner bead 42b provided inside the outer bead 42a. It should be noted that the first seal line 42 may include only one of the outer bead 42a and the inner bead 42b. Further, resin material may be coated to an area between the first seal line 42 and the first frame shaped sheet 24a.

The inner bead 42b is provided around the fuel gas flow field 38, the fuel gas supply passage 34a, and the fuel gas discharge passage 34b, and allows the fuel gas flow field 38 to be connected to the fuel gas supply passage 34a and the fuel gas discharge passage 34b. In the same manner as in the case of the ridges 39 forming the fuel gas flow field 38, on a side surface in cross section, each of the beads 42a, 42b is narrowed toward the frame member 24, and has a trapezoidal shape including a flat protruding end. A channel 38a is provided inside the first seal line 42 (on a side closer to the MEA 10a), and formed between the first separator 14 and the frame member 24. The channel 38a is connected to the fuel gas flow field 38, and the fuel gas is supplied to the channel 38a.

A second seal line 44 (metal bead seal: second seal) is provided on the surface 16a of the second separator 16, along the outer peripheral portion of the second separator 16. The second seal line 44 is formed integrally with the second separator 16, and expanded toward the frame member 24. The second seal line 44 is deformed elastically, and contacts the second frame shaped sheet 24b in an air-tight and liquid-tight manner. The first seal line 42 and the second seal line 44 face each other through the frame member 24, and the frame member 24 is held between the first seal line 42 and the second seal line 44. The second seal line 44 also includes an outer bead 44a and an inner bead 44b provided inside the outer bead 44a. It should be noted that resin member may be coated to an area between the second seal line 44 and the second frame shaped sheet 24b.

The inner bead 44b is provided around the oxygen-containing gas flow field 36, the oxygen-containing gas supply passage 30a, and the oxygen-containing gas discharge passage 30b, and allows the oxygen-containing gas flow field 36 to be connected to the oxygen-containing gas supply passage 30a and the oxygen-containing gas discharge passage 30b. In the same manner as the ridges 37 forming the oxygen-containing gas flow field 36, on a side surface in cross section, each of the beads 44a, 44b is narrowed toward the frame member 24, and has a trapezoidal shape including a flat protruding end. The channel 36a is provided inside the second seal line 44 (on a side closer to the MEA 10a), and formed between the second separator 16 and the frame member 24. The channel 36a is connected to the oxygen-containing gas flow field 36, and the oxygen-containing gas is supplied to the channel 36a. The first seal line 42 and the second seal line 44 may be made of elastic rubber material integrally with the separators 14, 16.

A height BH1 of each of the beads 42a, 42b of the first seal line 42 and a height BH2 of the height of each of the beads 44a, 44b of the second seal line 44 are the same. That is, at the joint portion between the frame member 24 and each separator 14, 16, the first seal line 42 and the second seal line 44 have the same height BH1=BH2. In contrast, in an active area where the electrolyte membrane 18 and each of separators 14, 16 are stacked together, the height SH2 of the ridges 37 forming the oxygen-containing gas flow field 36 is larger than the height SH1 of the ridges 39 forming the fuel gas flow field 38.

Further, in the first separator 14, a bottom 39a between the ridges 39 of the fuel gas flow field 38 and a bottom 42c between the beads 42a, 42b of the first seal line 42 are in the same plane (have the same height). Likewise, in the second separator 16, a bottom 37a between the ridges 37 of the oxygen-containing gas flow field 36 and a bottom 44c between the beads 44a, 44b of the second seal line 44 are in the same plane (have the same height).

Figure 3:
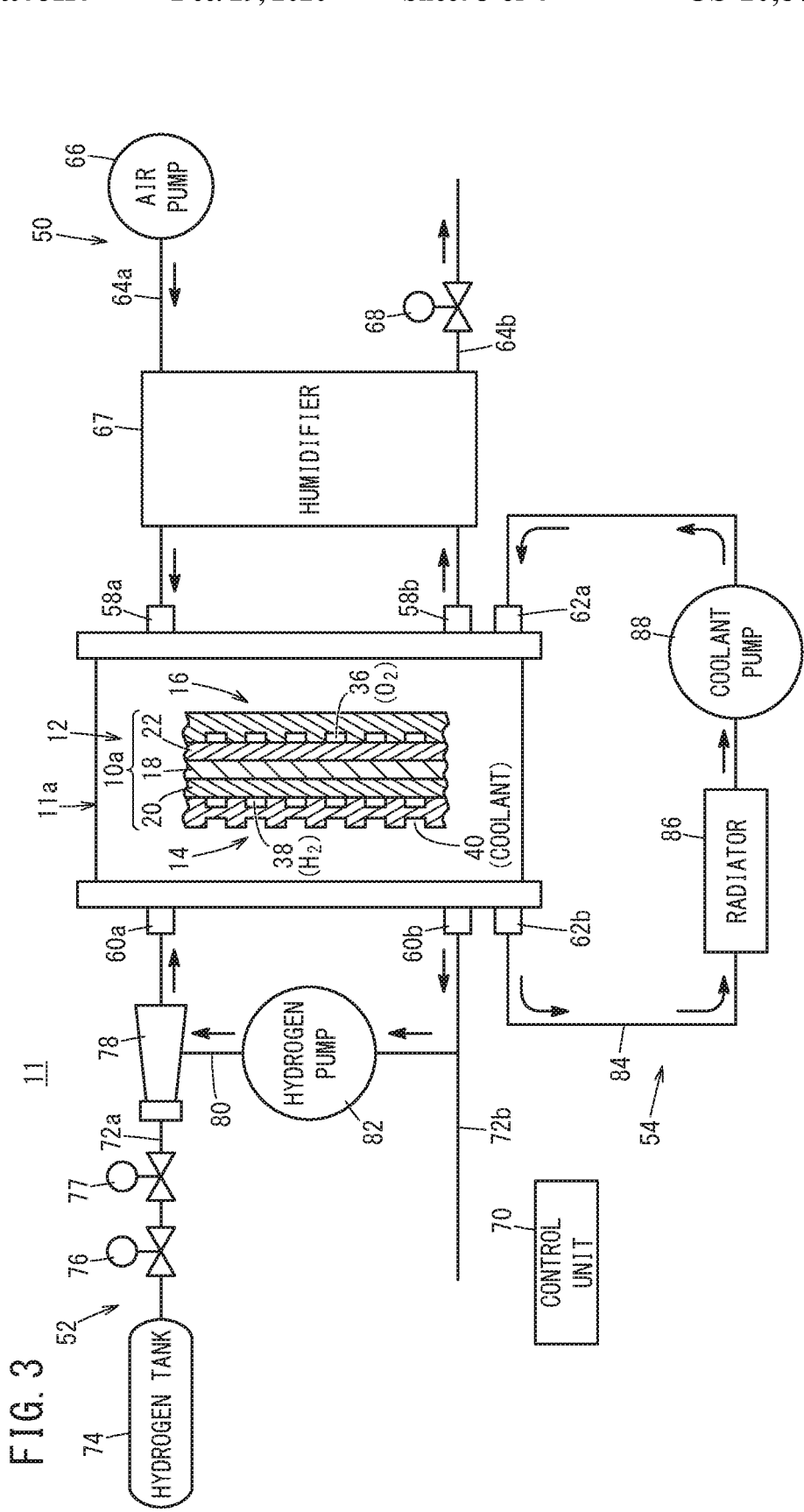
FIG. 3 is an overall diagram schematically showing a fuel cell system.

As shown in FIG. 3, a fuel cell system 11 includes the above fuel cell stack 11a, an oxygen-containing gas supply apparatus 50 for supplying the oxygen-containing gas to the fuel cell stack 11a, a fuel gas supply apparatus 52 for supplying the fuel gas to the fuel cell stack 11a, and a coolant supply apparatus 54 for supplying a coolant to the fuel cell stack 11a.

The oxygen-containing gas supply apparatus 50 includes an oxygen-containing gas supply pipe 64a connected to the oxygen-containing gas supply passage 30a (see FIG. 1) through an oxygen-containing gas supply manifold 58a provided for the fuel cell stack 11a, and an oxygen-containing gas discharge pipe 64b connected to the oxygen-containing gas discharge passage 30b (see FIG. 1) through an oxygen-containing gas discharge manifold 58b provided for the fuel cell stack 11a. An air pump 66 is provided for the oxygen-containing gas supply pipe 64a. A back pressure regulating valve 68 is provided in the oxygen-containing gas discharge pipe 64b.

A humidifier 67 is provided for the oxygen-containing gas supply pipe 64a and the oxygen-containing gas discharge pipe 64b. In the oxygen-containing gas supply pipe 64a, the air pump 66 is provided upstream of the humidifier 67. In the oxygen-containing gas discharge pipe 64b, the back pressure regulating valve 68 is provided downstream of the humidifier 67. A control unit 70 of the fuel cell system 11 controls at least one of the operation speed of the air pump 66 and the valve opening angle of the back pressure regulating valve 68 to control the pressure of the oxygen-containing gas flowing through the oxygen-containing gas flow field 36.

The fuel gas supply apparatus 52 includes a fuel gas supply pipe 72a connected to the fuel gas supply passage 34a (see FIG. 1) through a fuel gas supply manifold 60a provided for the fuel cell stack 11a, and a fuel gas discharge pipe 72b connected to the fuel gas discharge passage 34b (see FIG. 1) through a fuel gas discharge manifold 60b provided for the fuel cell stack 11a.

A hydrogen tank 74 for storing high pressure hydrogen is provided upstream of the fuel gas supply pipe 72a. In the fuel gas supply pipe 72a, a stop valve 76, a pressure regulating valve 77, and an ejector 78 are provided between the fuel gas supply manifold 60a and the hydrogen tank 74. A hydrogen circulation channel 80 is connected to the ejector 78 and the fuel gas discharge pipe 72b. A hydrogen pump 82 for hydrogen circulation is provided in the hydrogen circulation channel 80. The control unit 70 controls the speed of driving the hydrogen pump 82 to control the flow rate of the fuel gas flowing through the fuel gas flow field 38.

The coolant supply apparatus 54 includes a coolant circulation channel 84 for circulating, and supplying the coolant to the fuel cell stack 11a. The coolant circulation channel 84 is connected to the coolant supply passage 32a (see FIG. 1) through a coolant supply manifold 62a provided for the fuel cell stack 11a. The coolant circulation channel 84 is connected to the coolant discharge passage 32b (see FIG. 1) through a coolant discharge manifold 62b. A radiator 86 and a coolant pump 88 are provided for the coolant circulation channel 84. The control unit 70 controls the driving speed of the coolant pump 88 to control the flow rate of the coolant flowing through the coolant flow field 40.

The power generation cell (fuel cell) 12 according to the embodiment of the present invention basically has the above structure. Hereinafter, production of the power generation cell 12, and operation of the fuel cell system 11 including this power generation cell 12 will be described below.

In producing the power generation cell 12, firstly, the frame equipped MEA 10 is produced by joining the electrolyte membrane 18 and the anode 20 together such that the frame member 24 is provided between the electrolyte membrane 18 and the anode 20. In this case, the adhesive layer 24c of the frame member 24 is adhered to the electrolyte membrane 18. Then, the first separator 14 is provided on one surface of the frame equipped MEA 10, and the separator 16 is provided on the other surface of the frame equipped MEA 10. The frame equipped MEA 10 is sandwiched between the first separator 14 and the second separator 16 to form bead seal structure. Instead of the bead seals, seals of elastic rubber may be used. In this case, the seals have the same height.

As described above, in the power generation cell 12, the height BH1 of each bead 42a, 42b of the first seal line 42 of the first separator 14, and the height BH2 of each bead 44a, 44b of the second seal line 44 of the second separator 16 are the same (BH1=BH2). Therefore, the seal lines 42, 44 of the separators 14, 16 press the frame member 24 from both sides suitably, and tightly contract together.

After the power generation cell 12 is produced, the height SH2 of the ridges 37 of the second separator 16 is larger than the height SH1 of the ridges 39 of the first separator 14, and the central position MO of the MEA 10a sandwiched between the separators 14, 16 in the stacking direction is shifted from the central position FO of the frame member outer peripheral portion 25 of the frame member 24 in the thickness direction. Thus, even in the case where the heights of the ridges 37, 39 in the separators 14, 16, are different from each other, the same contact pressure is applied from the first seal line 42 and the second seal line 44 provided on both sides by the frame member 24 offset from the MEA 10a to exert a desired sealing function. Further, each of the separators 14, 16 can apply the contact pressure of the same level to the anode 20 and the cathode 22 in the surface direction, and it becomes possible to achieve uniform pressure of the stack structure.

The fuel cell system 11 includes the fuel cell stack 11a formed by stacking the plurality of the power generation cells 12. As shown in FIG. 3, in the oxygen-containing gas supply apparatus 50, air is supplied to the oxygen-containing gas supply pipe 64a under operation of the air pump 66. After the air is humidified through the humidifier 67, the air is supplied to the oxygen-containing gas supply passage 30a (see FIG. 1) through the oxygen-containing gas supply manifold 58a. The humidifier 67 adds water content and the heat discharged from the oxygen-containing gas discharge manifold 58b to the air to be supplied.

In the meanwhile, in the fuel gas supply apparatus 52, under opening operation of the stop valve 76, the fuel gas is supplied from the hydrogen tank 74 to the fuel gas supply pipe 72a. At this time, the fuel gas is supplied to the fuel gas supply passage 34a (see FIG. 1) through the fuel gas supply manifold 60a.

Further, in the coolant supply apparatus 54, under operation of the coolant pump 88, the coolant is supplied from the coolant circulation channel 84 to the coolant supply passage 32a (see FIG. 1).

Therefore, as shown in FIG. 1, the oxygen-containing gas is supplied to the oxygen-containing gas supply passage 30a, the fuel gas is supplied to the fuel gas supply passage 34a, and the coolant is supplied to the coolant supply passage 32a.

Therefore, the oxygen-containing gas flows from the oxygen-containing gas supply passage 30a to the oxygen-containing gas flow field 36 of the second separator 16, and moves in the direction indicated by the arrow B, and the oxygen-containing gas is supplied to the cathode 22 of the MEA 10a. In the meanwhile, the fuel gas flows from the fuel gas supply passage 34a to the fuel gas flow field 38 of the first separator 14. The fuel gas moves along the fuel gas flow field 38 in the direction indicated by the arrow B, and the fuel gas is supplied to the anode 20 of the MEA 10a.

Thus, in the MEA 10a, the oxygen-containing gas supplied to the cathode 22, and the fuel gas supplied to the anode 20 are partially consumed in the second electrode catalyst layer 22a and the first electrode catalyst layer 20a by electrochemical reactions to generate electrical energy.

The oxygen-containing gas contains nitrogen, carbon dioxide, etc. in addition to the oxygen. Therefore, preferably, in the power generation cell 12, the flow rate of the oxygen-containing gas supplied to the oxygen-containing gas flow field 36 is larger than the flow rate of the fuel gas supplied to the fuel gas flow field 38. In the embodiment of the present invention, as shown in FIG. 2, the height SH2 of the ridges 37 of the second separator 16 is larger than the height SH1 of the ridges 39 of the first separator 14. For example, it is possible to increase the flow rate of the oxygen-containing gas while keeping the pressure of the reactant gases supplied to the oxygen-containing gas flow field 36 and the fuel gas flow field 38 at the same level. Depending on the operating state, etc. of the fuel cell system 11, a differential pressure may be generated between the pressures of the reactant gases in the oxygen-containing gas flow field 36 and the fuel gas flow field 38.

Further, in the embodiment of the present invention, the thickness of the second electrode catalyst layer 22a of the cathode 22 is larger than the thickness of the first electrode catalyst layer 20a of the anode 20. Therefore, it is possible to improve the reactivity on the cathode 22 side in comparison with the anode 20 side.

Referring back to FIG. 1, the oxygen-containing gas partially consumed in the power generation is discharged in the direction indicated by the arrow A along the oxygen-containing gas discharge passage 30b. Likewise, the fuel gas partially consumed in power generation is discharged in the direction indicated by the arrow A along the fuel gas discharge passage 34b. Further, the coolant supplied to the coolant supply passage 32a flows into the coolant flow field 40 between the first separator 14 and the second separator 16, and then, the coolant flows in the direction indicated by the arrow B. After the coolant cools the separators 14, 16, and the MEA 10a, the coolant is discharged through the coolant discharge passage 32b.

As described above, in the power generation cell 12 (fuel cell) according to the embodiment the present invention, the height of the oxygen-containing gas flow field 36 formed by the second separator 16 is larger than the height of the fuel gas flow field 38 formed by the first separator 14. Thus, it is possible to increase the flow rate of the oxygen-containing gas supplied to the oxygen-containing gas flow field 36. That is, even if the gas components (nitrogen, carbon dioxide, etc.) other than the gas which contributes to reaction are mixed with the oxygen-containing gas, it is possible to sufficiently supply the oxygen, and perform power generation in the MEA 10a suitably. Further, in the power generation cell 12, the central position MO of the MEA 10a in the thickness direction and the central position FO of the frame member outer peripheral portion 25 of the frame member 24 in the thickness direction are offset from each other. Therefore, even in the structure where the height of the oxygen-containing gas flow field 36 formed by the second separator 16 is larger than the height of the fuel gas flow field 38 formed by the first separator 14, in the frame member outer peripheral portion 25, it is possible to achieve the desired sealing performance between each of the separators 14, 16 and the frame member 24. Therefore, it is possible to greatly improve the power generation performance and the durability of the power generation cell 12.

Further, in the power generation cell 12, the height of each bead 42a, 42b of the first seal line 42 and the height of each bead 44a, 44b of the second seal line 44 are the same. In the structure, at the time of sealing by the beads, it is possible to apply the same contract pressure from the first seal line 42 and the second seal line 44 to the frame member 24 to exert the seal function. Thus, it becomes possible to hold the MEA 10a and the frame member 24 between the separators 14, 16 by the designed pressure suitably.

Further, the first and second seal lines 42, 44 form bead seal structure. Thus, the first and second seal lines 42, 44 are joined to the frame member 24 suitably. Thus, it is possible to stably form the stack structure of the MEA 10a inside the first and second seal lines 42, 44 and the first and second separators 14, 16.

Alternatively, the first and second seal lines 42, 44 may be formed of the elastic rubber material. Also in this respect, it is possible to stably form the stack structure of the MEA 10a and the first and second separators 14, 16.

Further, in the power generation cell 12, the first frame shaped sheet 24a is provided between the electrolyte membrane 18 and the anode 20. In the structure, it becomes possible to suitably establish the state where the MEA 10a is offset from the frame member 24, and firmly fix the MEA 10a and the frame member 24 together.

In the power generation cell 12 where the second separator 16 is higher than the first separator 14, it is possible to easily increase the channel cross sectional area of the oxygen-containing gas flow field 36, and establish structure where the separators 14, 16 are stacked together, and supported by each other. Thus, it is possible to increase the flow rate of the oxygen-containing gas supplied to the cathode 22, and improve the power generation efficiency of the MEA 10a.

In the power generation cell 12, the thickness of the second electrode catalyst layer 22a of the cathode 22 is larger than the thickness of the first electrode catalyst layer 20a of the anode 20. Therefore, it is possible to increase the reactivity on the cathode 22 side in comparison with the anode 20 side.

In the power generation cell 12, the thickness of the second gas diffusion layer 22b of the cathode 22 is the same as the thickness of the first gas diffusion layer 20b of the anode 20. Therefore, the same material can be used for both of the second gas diffusion layer 22b of the cathode 22 and the first gas diffusion layer 20b of the anode 20. In the case of forming the fuel cell stack 11a by the power generation cells 12, it is possible to reduce the size of the fuel cell stack 11a, and improve the power generation performance, etc. (which depends on the load current).

Second Embodiment

Figure 4:
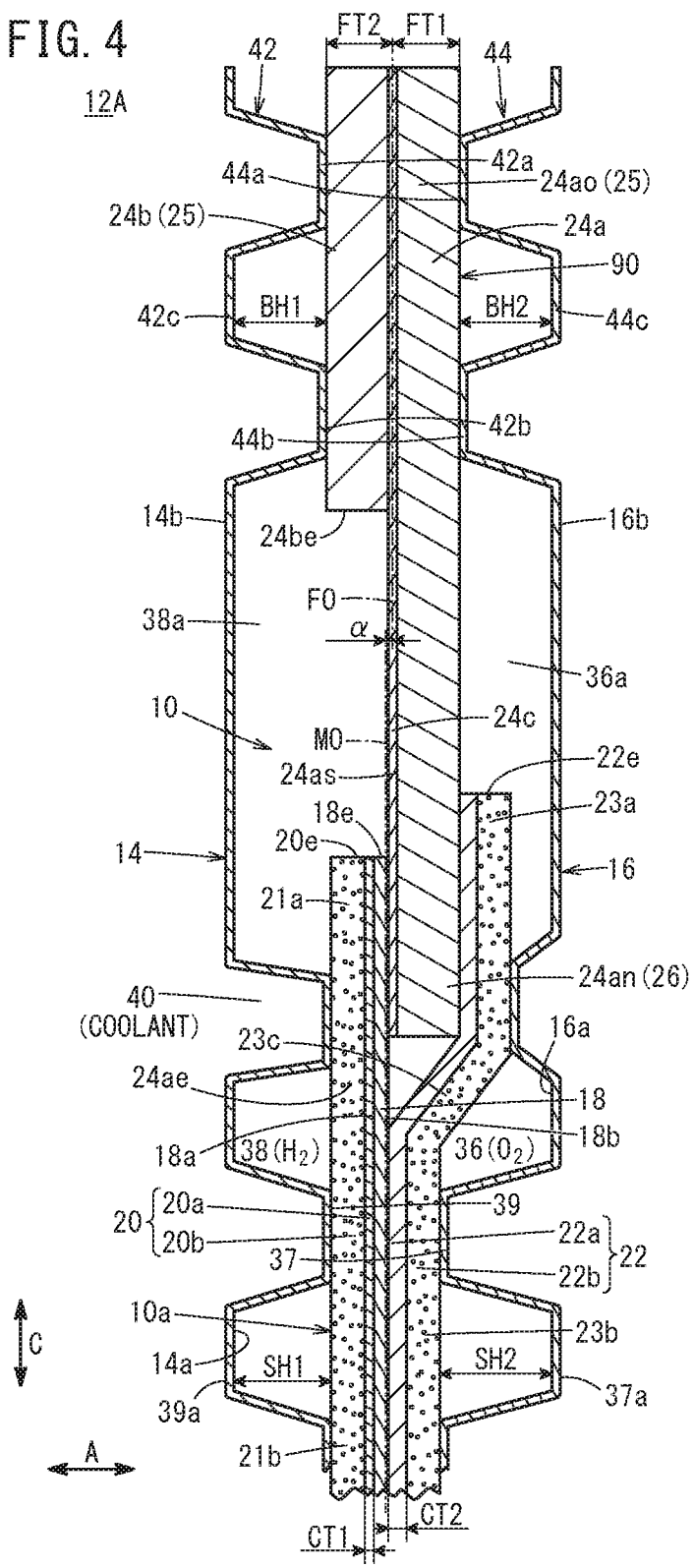
FIG. 4 is a cross sectional view showing main components of a power generation cell according to a second embodiment of the present invention.

Next, a power generation cell (fuel cell) 12A according to a second embodiment of the present invention will be described with reference to FIG. 4. In the following description, the structure of the power generation cell 12A that is identical to that of the power generation cell 12 according to the first embodiment, or the structure having the function that is identical to that of the power generation cell 12 according to the first embodiment are labeled with the same reference numerals, and description thereof will be omitted.

In this power generation cell 12A, a frame member inner peripheral portion 26 of a frame member 90 is joined between the electrolyte membrane 18 and the cathode 22. In this respect, the power generation cell 12A is different from the power generation cell 12 according to the first embodiment. In this case, it is preferable for the anode 20 to have a flat shape from the area 21b overlapped with the electrolyte membrane 18 to the area 21a overlapped with the inner peripheral portion 24an of the first frame shaped sheet 24a. It should be noted that the anode 20 may have an inclined area corresponding to an inclined area 23c of the cathode 22.

Further, it is preferable for the cathode 22 to have the inclined area 23c inclined relative to the electrolyte membrane 18, between the area 23b overlapped with the electrolyte membrane 18 and the area 23a overlapped with the inner peripheral portion 24an of the first frame shaped sheet 24a. Further, the surface size of the cathode 22 is larger than the surface size of the anode 20 (an outer end 22e of the cathode 22 is positioned outside an outer end 20e of the anode 20).

Further, the frame member 90 of the power generation cell 12A has structure where, in the frame member outer peripheral portion 25, the first frame shaped sheet 24a is positioned on a side closer to the second separator 16, and the second frame shaped sheet 24b is positioned on a side closer to the first separator 14. Further, the thickness FT1 of the outer peripheral portion 24ao of the first frame shaped sheet 24a of the frame member 90 and the thickness FT2 of the second frame shaped sheet 24b have the same size (FT1=FT2). In the structure, the central position FO of the frame member 90 in the thickness direction is positioned at the center of the adhesive layer 24c where the first frame shaped sheet 24a and the second frame shaped sheet 24b are adhered together. Further, the central position FO of the frame member 90 in the thickness direction is offset from the central position MO of an active area of the MEA 10a in the thickness direction.

That is, in the state where the first separator 14, the second separator 16, and the frame member 90 are stacked together in the outer peripheral portion of the power generation cell 12A, the height BH1 of each bead 42a, 42b of the first seal line 42 and the height BH2 of each bead 44a, 44b of the second seal line 44 are the same, and the thickness FT1 of the first frame shaped sheet 24a and the thickness FT2 of the second frame shaped sheet 24b are the same. In the structure, in the power generation cell 12A, the separators 14, 16 are pressed against the first frame shaped sheet 24a and the second frame shaped sheet 24b, and the separators 14, 16 and the first frame shaped sheet 24a and the second frame shaped sheet 24b are joined together tightly. Therefore, it is possible apply the contact pressure at the same level to the anode 20 and the cathode 22 inside the bead seal part by the separators 14, 16. Thus, it becomes possible to achieve the uniform pressure in the stack structure suitably.

The present invention is not limited to the above first and second embodiments. It is a matter of course that various modifications are made in line with the gist of the present invention. For example, the power generation cell 12 may include the oxygen-containing gas flow field 36 for supplying the oxygen-containing gas between the MEA 10a and the first separator 14, and the fuel gas flow field 38 for supplying the fuel gas between the MEA 10a and the second separator 16 (i.e., structure where the anode 20 and the cathode 22 are positioned conversely). Also in this case, it is possible to adopt structure where the height of the second separator 16 is larger than the height of the first separator 14.

What is claimed is:

1. A fuel cell comprising: a membrane electrode assembly, the membrane electrode assembly including an electrolyte membrane, and a first electrode and a second electrode provided on both surfaces of the electrolyte membrane, respectively; a first separator stacked on the first electrode of the membrane electrode assembly; and a second separator stacked on the second electrode of the membrane electrode assembly, wherein a first flow field is formed between the first separator and the first electrode, a first reactant gas is supplied to the first flow field, a second flow field is formed between the second separator and the second electrode, and a second reactant gas is supplied to the second flow field, wherein a frame member is provided around an outer peripheral portion of the membrane electrode assembly, the frame member being configured to be held between the first separator and the second separator;

the frame member includes a frame member inner peripheral portion joined to the membrane electrode assembly and a frame member outer peripheral portion which is continuous with the frame member inner peripheral portion and thicker than the frame member inner peripheral portion;

the frame member outer peripheral portion is sandwiched between a first seal forming bead seal structure on the first separator and a second seal forming bead seal structure on the second separator;

a height of the second flow field formed by the second separator, from the membrane electrode assembly is larger than a height of the first flow field formed by the first separator, from the membrane electrode assembly; and a central position of the frame member outer peripheral portion in a thickness direction is shifted toward the second separator with respect to a central position of the membrane electrode assembly in a thickness direction.

2. The fuel cell according to claim 1, wherein the frame member comprises a first frame shaped sheet including the frame member inner peripheral portion and a second frame shaped sheet joined to the first frame shaped sheet in a manner that the first frame shaped sheet and the second frame shaped sheet jointly form the frame member outer peripheral portion; and a thickness of the second frame shaped sheet is larger than a thickness of the first frame shaped sheet.

3. The fuel cell according to claim 1, wherein the frame member comprises a first frame shaped sheet including the frame member inner peripheral portion and a second frame shaped sheet joined to the first frame shaped sheet in a manner that the first frame shaped sheet and the second frame shaped sheet jointly form the frame member outer peripheral portion; and a thickness of the first frame shaped sheet and a thickness of the second frame shaped sheet are same.

4. The fuel cell according to claim 3, wherein the first frame shaped sheet is held between, and joined to the electrolyte membrane and the first electrode or the second electrode.

5. The fuel cell according to claim 1, wherein the first electrode is an anode, and the second electrode is a cathode;

the first flow field is configured to supply a hydrogen-containing gas as the first reactant gas to the anode; and the second flow field is configured to supply an oxygen-containing gas as the second reactant gas to the cathode.

6. The fuel cell according to claim 5, wherein each of the anode and the cathode includes structure where a catalyst layer and a gas diffusion layer are stacked together; and a thickness of the catalyst layer of the cathode is larger than a thickness of the catalyst layer of the anode.

* * * * *